(12) United States Patent
Ungan et al.

(10) Patent No.: US 8,958,766 B2
(45) Date of Patent: Feb. 17, 2015

(54) ELECTRONIC DEVICE COMPRISING AN OPERATING MODE SWITCHING UNIT

(71) Applicant: SmartExergy GmbH, Freiburg (DE)

(72) Inventors: Tolgay Ungan, Freiburg (DE); Gerd Ulrich Gamm, Freiburg (DE); Leonhard Michael Reindl, Kirchzarten (DE); Thomas Ostertag, Geretsried (DE); Matthias Sippel, Fulda (DE); Thomas Wendt, Simonswald (DE)

(73) Assignee: SmartExergy WMS GmbH, Freiburg (DE)

( * ) Notice: Subject to any disclaimer, the term of this patent is extended or adjusted under 35 U.S.C. 154(b) by 132 days.

(21) Appl. No.: 13/740,435

(22) Filed: Jan. 14, 2013

(65) Prior Publication Data

US 2013/0130636 A1     May 23, 2013

Related U.S. Application Data

(63) Continuation-in-part of application No. PCT/EP2011/002443, filed on May 17, 2011.

(30) Foreign Application Priority Data

May 17, 2010   (DE) .......................... 10 2010 020 733

(51) Int. Cl.
  *H04B 1/06*   (2006.01)
  *H04B 7/00*   (2006.01)
  *H04B 1/16*   (2006.01)
  *H04W 52/02*  (2009.01)

(52) U.S. Cl.
  CPC ............. *H04B 1/16* (2013.01); *H04W 52/0235* (2013.01)
  USPC ............. 455/230; 455/78; 455/295; 455/313; 455/334

(58) Field of Classification Search
  USPC .................. 455/78–83, 127, 129, 230, 232.1, 455/234.1, 248.1, 295, 313, 334
  See application file for complete search history.

(56) References Cited

U.S. PATENT DOCUMENTS

| 6,321,067 | B1 * | 11/2001 | Suga et al. ................... 455/41.2 |
| 8,200,182 | B2 * | 6/2012 | Kawasaki ................. 455/343.2 |
| 2010/0040120 | A1 | 2/2010 | Sharma | |

FOREIGN PATENT DOCUMENTS

| EP | 0 828 306 A2 | 3/1998 |
| WO | WO 2004/077761 A1 | 9/2004 |

OTHER PUBLICATIONS

Bas van der Doom, et al. "A prototype low-cost wakeup radio for the 868 MHz band", Int. J. Sensors Networks, vol. 5, No. 1, 2009, pp. 22-32.

*Primary Examiner* — Nhan Le
(74) *Attorney, Agent, or Firm* — R. S. Lombard

(57) ABSTRACT

An electronic appliance comprising an electrical circuit and an operating mode switching unit which can be awakened out of a sleep state into a working state in which the current consumption of the circuit is greater in than in the sleep state. To receive a radio signal, the appliance has a receiver comprising a UHF carrier that is amplitude-modulated by a modulation signal. The receiver comprises a UHF antenna connected to a passive filter stage to an input of a passive rectifier circuit. An output of the rectifier circuit is connected to a detector for the modulation signal. To wake the electrical circuit from the sleep state, the operating mode switching unit has a control connection to the detector. The appliance has a low current draw in the sleep state by matching the output impedance of the rectifier circuit to the input impedance of the detector.

12 Claims, 5 Drawing Sheets

ELECTRONIC DEVICE COMPRISING AN OPERATING MODE SWITCHING UNIT

CROSS-REFERENCE TO RELATED APPLICATION

This is a continuation-in-part application of pending international application PCT/EP2011/002443 filed May 17, 2011 and claiming the priority of German Application No. 10 2010 020 73317 filed May 17, 2010.

BACKGROUND OF THE INVENTION

The invention relates to an electronic appliance having an electrical circuit and an operating mode switching device which is associated with the latter and which can be used to wake the circuit from a quiescent state into an operating state in which the current draw of the circuit is greater than in the quiescent state, having a receiver for receiving a radio signal which has a carrier which has been subjected to amplitude modulation with a modulation signal, wherein the receiver has a UHF antenna which is connected to an input of a passive rectifier circuit via a passive impedance converter stage, wherein an output of the rectifier circuit is connected to a detection device for the modulation signal, and wherein the operating mode switching device has a control connection to the detection device for the purpose of waking the electrical circuit which is in the quiescent state.

An electronic appliance of this kind which is in the form of a battery-operated radio sensor node for a wireless sensor network and has a transceiver as an electrical circuit is known from Bas van der Doom et al. "A prototype low-cost wakeup radio for the 868 MHz band", Int. J. Sensors Networks, vol. 5, no. 1, 2009, pages 22-32. Such an electronic appliance can easily be used to transmit data without complex wiring. A drawback in this case, however, is that the battery of the appliance has only a limited life. Networks in which the batteries in the appliances need to be replaced every month give rise to more costs in the long run than the one-off investment for the wiring of a corresponding wired network. This is the case particularly when the appliances are used at locations which can be accessed only with difficulty.

In order to reduce the power draw, the electrical circuit of the previously known appliance can be put into a quiescent state and an operating state by means of an operating mode switching device. In the quiescent state, the power draw is reduced in comparison with the operating state. By way of example, this can be achieved by disconnecting portions of the circuit in the quiescent state. What is known as waking the appliance takes place wirelessly using a radio signal which is emitted by a base station, for example. Said radio signal has a carrier in the 868 MHz band which has been subjected to OOK (on-off keying) amplitude modulation with a 125 kHz modulation signal. The OOK amplitude modulation involves the carrier being periodically switched on and off at a rate of 862 Hz. Since the carrier is in the UHF band, the appliance can be woken over a relatively long distance.

In order to receive the radio signal, the appliance has a receiver which has a UHF antenna which is connected to an input of a passive rectifier circuit via a passive impedance converter stage. The output of the rectifier circuit is connected to an interrupt input of a microcontroller via an operational amplifier, said microcontroller serving as a detection device for the modulation signal or the wakeup signal. The microcontroller is connected to an interrupt input of a microcomputer which controls the transceiver. Upon detection of the modulation signal, the microcomputer is woken via the interrupt input. However, the appliance still has a relatively high current draw even in the quiescent state. In particular, the operational amplifier, which needs to be in constant operation even in the quiescent state so that the appliance can be woken at any time, requires a relatively large amount of power.

It is therefore the object of providing an appliance of the type cited in the outset which allows a low current draw.

SUMMARY OF THE INVENTION

This object is achieved in that for the purpose of matching the output impedance of the rectifier circuit to the input impedance of the detection device the output of the rectifier circuit and the detection device have a passive filter arranged between them which passes the modulation signal, and in that the filter and/or the filter stage has/have an LC resonant circuit having a quartz oscillator and/or a microacoustic resonator.

In this case, the LC resonant circuit is dimensioned such that, the quartz oscillator and/or the microacoustic resonator is/are operated between its/their series resonant frequency and its/their parallel resonant frequency, i.e. in the case of the filter stage the carrier frequency is between the series resonant frequency and the parallel resonant frequency of the LC resonant circuit and/or in the case of the filter the modulation frequency is between the series resonant frequency and the parallel resonant frequency of the LC resonant circuit. The quartz oscillator and/or the microacoustic resonator is/are used as a high-quality inductance. Hence, the filter stage having the quartz oscillator and/or the microacoustic resonator transforms the antenna impedance at high quality into the input impedance of the rectifier circuit or the passive filter having the quartz oscillator and/or the microacoustic resonator transforms the output impedance of the rectifier circuit into the input impedance of the detection device. For this purpose, the passive filter is dimensioned such that in the frequency range of the modulation signal the output impedance of the filter connected to the UHF antenna via the rectifier circuit is closer to the input impedance of the detection device than the output impedance of the rectifier circuit. The frequency response of the filter is chosen such that the filter passes the frequency range of the modulation signal and that frequencies outside this frequency range are attenuated. Hence, noise and interference signals, such as mobile radio signals, are rejected, as a result of which the current draw by the detection device is additionally reduced. Preferably, a quart oscillator having a resonant frequency of 32,768 Hz is used, which is also used in quartz docks and is therefore available inexpensively in large numbers.

It is advantageous when filter passes a modulation signal, the frequency or frequency range of which is between 10 kHz and 1.3 MHz, particularly above 30 kHz and preferably above 100 kHz. The passive filter then allows compact dimensions. Since the switching losses of the detection device are roughly proportional to the frequency, the detection device can be operated in power-saving fashion at these relatively low frequencies. Since the radio signal in a relatively high frequency range, namely in the UHF range, the low power draw by the detection device is combined with the advantage of a long radio range. Furthermore, compact dimensions are obtained for the antenna.

In one expedient refinement of the invention, the LC resonant circuit has a capacitance which is connected in series with the quartz oscillator and/or the microacoustic resonator in a current path which connects the UHF antenna to a connection for a constant potential, wherein the quartz oscillator and/or the microacoustic resonator and the capacitance are connected to a node which is connected to the input of the rectifier circuit. In this case, the quartz oscillator or the microacoustic resonator can connect the antenna to the input of the rectifier circuit and the capacitance can connect the input of the rectifier circuit to the connection for the constant potential. Alternatively, an inverted arrangement is possible, in which the capacitance connects the antenna to the input of the rectifier circuit and the quartz oscillator or the microacoustic resonator connects the input of the rectifier circuit to the connection for the constant potential.

In one advantageous embodiment of the invention, the LC resonant circuit has a capacitance which is connected in series with the quartz oscillator and/or the microacoustic resonator in a current path which connects the output of the rectifier circuit to a connection for a constant potential, wherein the quartz oscillator and/or the microacoustic resonator and the capacitance are connected to a node which is connected to the input, of the detection device. In this case, the quartz oscillator or the microacoustic resonator can connect the output of the rectifier circuit to the input of the detection device and the capacitance can connect the input of the detection device to the connection for the constant potential. Alternatively, an inverse arrangement is possible, in which the capacitance connects the output of the rectifier circuit, to the input of the detection device and the quartz oscillator or the microacoustic resonator connects the input of the detection device to the connection for the constant potential.

In another advantageous embodiment of the invention, the LC resonant circuit is a series resonant circuit which is arranged in a current path which connects the UHF antenna to the passive rectifier circuit. In this case, the resonator formed by the antenna and the resonator formed by the LC resonant circuit are coupled to one another. This measure also allows the signal applied to the antenna to be coupled into the detection device with no loss at a relatively high power.

It is advantageous when the current path which connects the UHF antenna to the passive rectifier circuit contains a switching apparatus which can be used to periodically interrupt this current path. This allows even better transformation of the antenna impedance into the input impedance of the detection device.

In one preferred refinement of the invention, the carrier signal has a modulation signal which is modulated with an information signal, wherein the detection device has a demodulation device for demodulating the information signal, wherein the detection device has a correlation device for comparing the information signal with a predetermined address signal that is associated with the electronic appliance, and wherein the correlation device has a control connection to the operating mode switching device such that the electrical circuit is woken only when the data signal matches the address signal. Advantageously, this allows a single appliance or a group of appliances in a network which comprises a plurality of the electronic appliances according to the invention to be woken in targeted fashion using the radio signal. In this case, the remainder of the appliances in the network can remain in the quiescent state. The demodulation device and the correlation device are preferably integrated in what is known as a wakeup receiver. In this case, it is even possible for a commercially available wakeup receiver to be used which is also used in radio frequency identification systems, for example in motor vehicles. Such identification systems are also known by the name "convenient access" or "keyless go".

It is advantageous when the appliance is in the form of a radio node in which the electrical circuit has a UHF transceiver that is connected to the UHF antenna. When the appliance has been woken a base station or an appropriate further appliance can then send and/or receive information to and/or from the appliance cited first at a relatively high data rate in the UHF band. In this case, it is even possible for the appliance to emit the information again, and forward it to another appliance, when said information has been received.

In one expedient refinement of the invention, the electrical circuit has a microcomputer. This may be connected to at least one sensor and/or an actuator. When the electronic appliance has been woken, data captured using the sensor can then be transmitted to another appliance and/or a base station using the radio signal. In addition, it is possible to transmit information for controlling the actuator, such as switch-on/off commands, to the microcomputer using the radio signal and to control the actuator on the basis of the information using an operating program running on the microcomputer.

In one preferred embodiment of the invention, the UHF antenna can be selectively or alternately connected to the UHF transceiver and the passive filter stage by means of a switching device, wherein the switching device has a control connection to the detection device such that the UHF antenna is connected to the passive filter stage in the quiescent state of the electrical circuit and to the UHF transceiver in the operating state. The UHF antenna is thus connected to the passive filter stage only the quiescent state. This prevents radio signals that are applied to the UHF antenna by the UHF transceiver from being able to reach the passive filter stage and hence the detection device of the appliance. Hence, the power dray by the appliance is additionally reduced.

BRIEF DESCRIPTION OF THE DRAWINGS

An exemplary embodiment of the invention is explained in more detail below with reference to the drawings, in which.

DETAILED DESCRIPTION OF THE
PARTICULAR EMBODIMENTS

Figure 1:
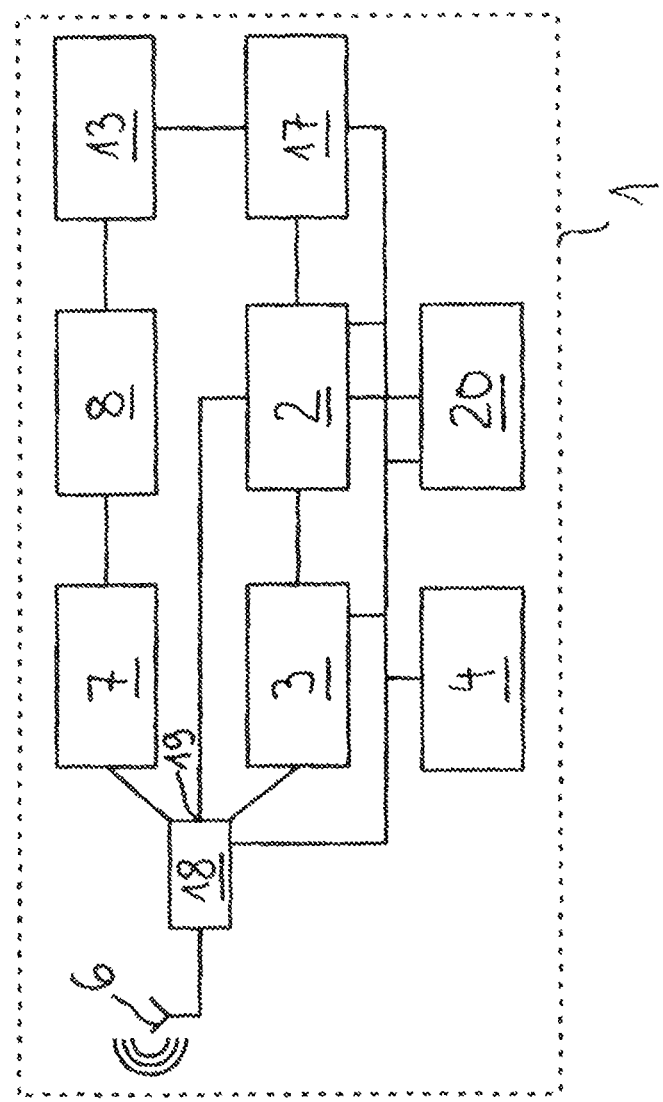
FIG. 1 shows a block diagram of an electronic appliance which is connected to a base station via a UHF radio link; and, FIGS. 2 to 7 show circuit diagrams of receivers for receiving a modulation signal that has been amplitude modulated onto a radio signal, said receivers having a rectifier circuit which has a passive filter for matching its output impedance to the input impedance of a detection device.
Figure 1:
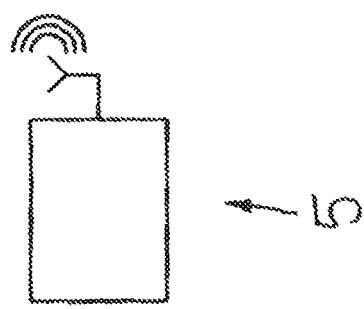

An electronic appliance 1 which is in the form of a radio sensor node and which is denoted by 1 as a whole in FIG. 1 has an active electrical circuit which has a microcomputer 2 and a UHF transceiver 3. For the purpose of supplying power to the electrical circuit, an energy store 4 is provided, which may be a battery, a storage battery or a capacitor, for example.

The electrical circuit has an associated operating mode switching device (18), which is not shown in more detail in the drawings, which can be used to put the circuit into a quiescent state and into an operating state. In order to save power, the current draw by the circuit is reduced in the quiescent state in comparison with the operating state.

Furthermore, the electronic appliance 1 has a receiver for receiving a radio signal emitted by a base station 5 or another appliance 1. The radio signal has a UHF carrier which has been subjected to amplitude modulation with an approximately square-wave modulation signal. The carrier frequency of the carrier is approximately 868 MHz. The modulation signal has a carrier signal of 125 kHz, which has been subjected to OOK modulation with a digital information signal.

Figure 2:
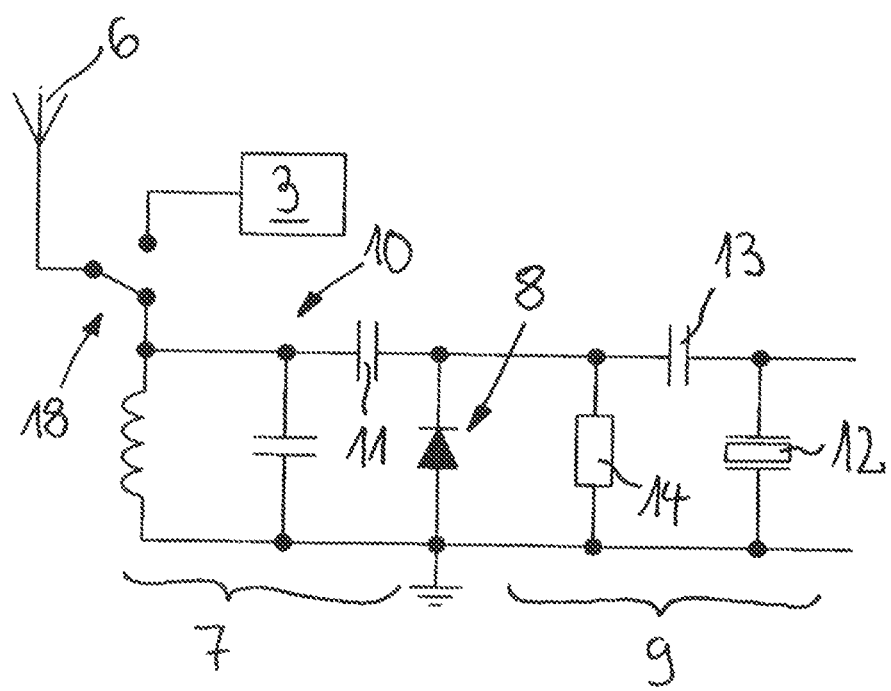

FIG. 2 reveals that the receiver has a UHF antenna 6 which is connected to an input of a passive rectifier circuit 8 via a passive filter stage 7. The passive filter stage 7 is used to match the impedance of the UHF antenna 6 to the input impedance of the rectifier circuit 8. For this purpose, the filter stage 7 has an output impedance of approximately 50 ohms. The output impedance of the passive filter stage 7 is matched to the input impedance of the Schottky diodes in the rectifier circuit 8 and is in the kiloohm range at low input powers. The output of the rectifier circuit 8 is connected to an input of a passive filter 9, see FIG. 2.

In the exemplary embodiment shown in FIG. 2, the passive filter stage 7 has a parallel resonant circuit 10 which has first connection connected to the UHF antenna 6, and additionally, via a coupling capacitor 11 to an input of the rectifier circuit 8. A second connection of the passive filter stage 7 is connected to a ground potential connection.

In the exemplary embodiment shown in FIG. 2, the passive filter 9 has a quartz oscillator 12. A first connection of the quartz oscillator 12 is connected to the ground potential connection and a second connection is connected via a capacitance 13 to a first connection of a Schottky diode which forms the rectifier circuit 8. A second connection of the Schottky diode is at ground potential. Connected in parallel with the Schottky diode is an impedance 14.

Figure 3:
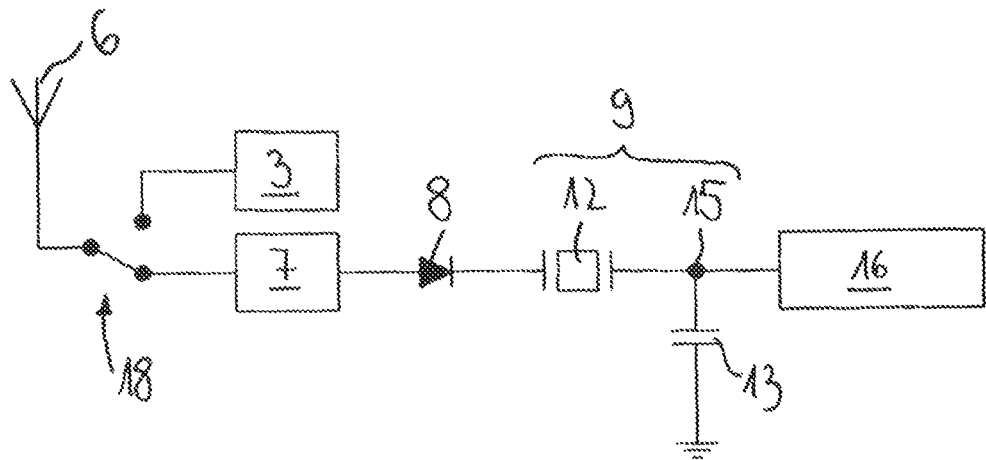
Figure 4:
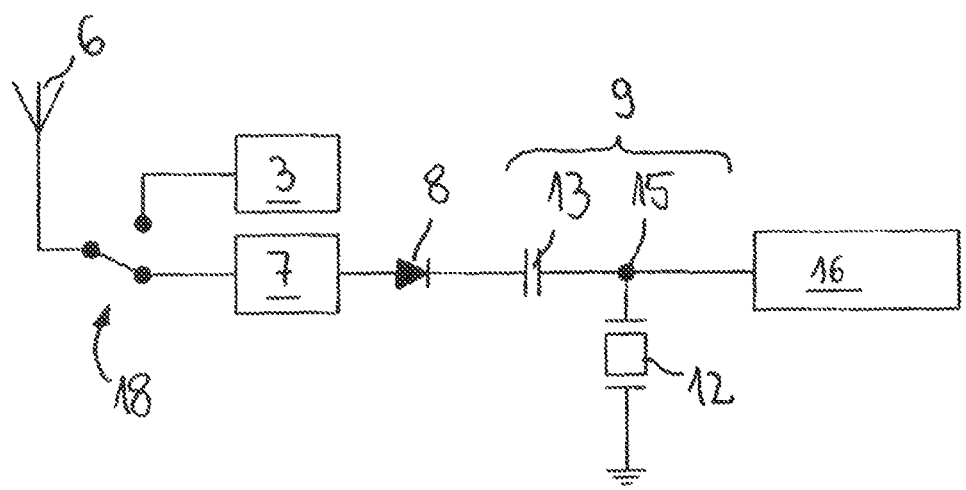

In the exemplary embodiments shown in FIGS. 3 and 4, the LC resonant circuit is a respective series resonant circuit in which the quartz oscillator 12 and the capacitance 13 are connected in series in a current path which connects the output of the rectifier circuit 8 to the ground connection. In FIG. 3, the quartz oscillator 12 has a first connection connected at the output of the rectifier circuit 8 and has a second connection connected to a node 15. Connected to the node 15 are the input of a detection device 16 and a first electrode of the capacitance 13. A second electrode of the capacitance 13 is connected to the ground connection.

In FIG. 4, the first electrode of the capacitance 13 is connected to the output of the rectifier circuit 8 and the second electrode is connected to the node 15. The quartz oscillator 12 has its first connection connected to the node 15 and also to the input of the detection device 16 and has its second connection connected to the ground connection. In FIG. 4, the quartz oscillator 12 and the capacitor 13 are thus interchanged in comparison with FIG. 3.

The detection device 16 has a wakeup receiver of type AS3932 from the manufacturer austriamicrosystems. In order to wake the electrical circuit which is in the quiescent state, the detection device 16 has a control connection to the operating made switching device.

The detection device 16 has a demodulation device—not shown in more detail in the drawings—for demodulating the OOK information signal that has been modulated onto the 125 kHz carrier signal. The demodulation device can be used to provide the information signal as a digital signal in the detection device 16.

The demodulation device is connected to a correlation device which is used to compare the information signal with a predetermined address signal that is explicitly associated with the electronic appliance 1. The address signal may be stored in a nonvolatile data memory, for example, from which it can be loaded into the correlation device.

The correlation device has a control connection to the operating mode switching device such that the electrical circuit is woken only when the data signal matches the address signal.

Figure 5:
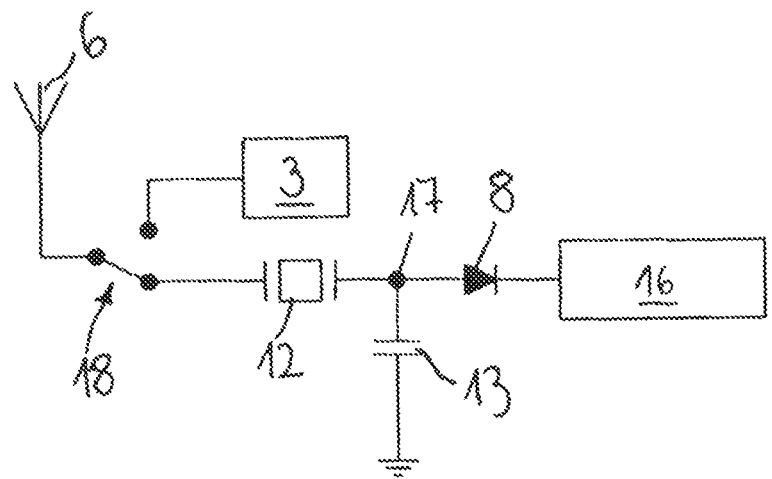
Figure 6:
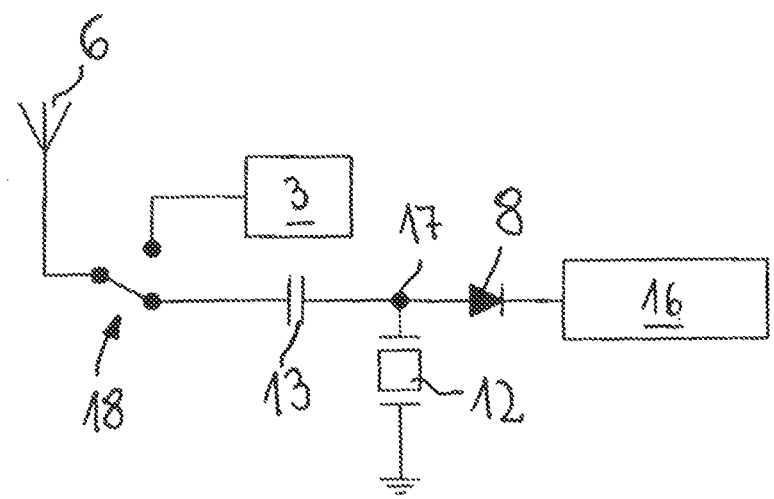

In the exemplary embodiments shown in FIGS. 5 and 6, the LC resonant circuit, is a respective series resonant circuit in which the quartz. oscillator 12 and the capacitance 13 are connected in series in a current path which connects the antenna 6 to the ground connection. In FIG. 5, the quartz oscillator 12 has a first connection connected to the antenna 6 and has a second connection connected to a node 17 which is connected to the input of the rectifier circuit 8. The first electrode of the capacitance 13 is connected at the node 17 and the second electrode is connected to the ground connection.

In FIG. 6, the first electrode of the capacitance 13 is connected to the antenna 6 and the second electrode is connected to the node 17. The quartz oscillator 12 has its first connection connected to the node 17 and to the input of the rectifier circuit 8 and has its second connection connected to the ground connection. In FIG. 6, the quartz oscillator 12 and the capacitor 13 are thus interchanged in comparison with FIG. 5.

In the exemplary embodiments shown in FIGS. 5 and 6, the filter 9 is dimensioned such that it transforms the output impedance of the rectifier circuit 8 to a respective value which corresponds to approximately the input impedance of the detection device 16.

Figure 7:
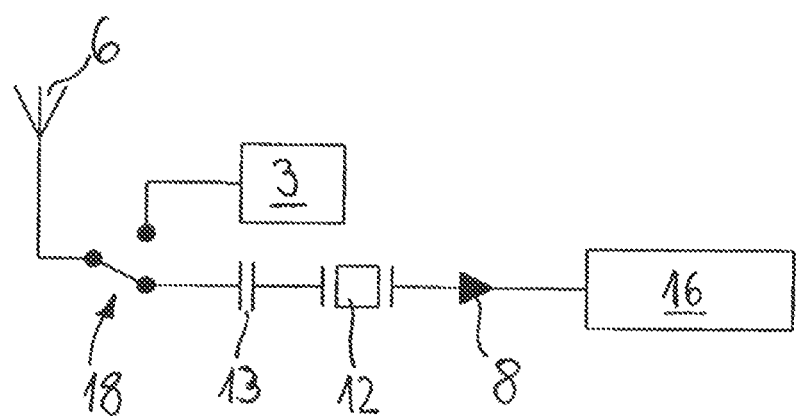

In the exemplary embodiment shown in FIG. 7, the LC resonant circuit is a series resonant circuit in which the quartz oscillator 12 and the capacitance 13 are connected in series in a current path which connects the antenna 6 to the input of the rectifier circuit 8. In this case, the capacitance 13 is arranged between the antenna 6 and the quartz oscillator 12. The output of the rectifier circuit is connected directly to the input of the detection device 16 in this case.

It should also be mentioned that instead of the quartz oscillator 12 it is also possible to use a surface acoustic wave (SAW) resonator or a bulk acoustic wave (BAW) resonator. The explanations provided above apply to these embodiments accordingly.

FIG. 1 reveals that the UHF antenna 6 can be connected either to the UHF transceiver 3 or to the passive filter stage 7 by means of a switching device 18. The switching device 18 has a control input 19 which has a control connection to the detection device 16 via a control line, and the microcomputer 2 such that the UHF antenna is connected to the passive filter stage 7 in the quiescent state of the electrical circuit and to the UHF transceiver 3 in the operating state.

The way in which the appliance 1 works is described below: after the microcomputer 2 has been reset, it starts up in line with an operating program stored in a program memory. The UHF transceiver 3, which has a semiconductor chip of type C1101, and the wakeup receiver are also started up. This involves making register settings. The microcomputer 2 is used to set the switching device 18 such that it connects the UHF antenna 6 to the filter stage 7. The UHF transceiver 3 and the microcomputer 2 are then put into the quiescent state. The detection device 16 remains active, but draws only a few µA of current. During the quiescent mode, the logic level at the control input 19 of the switching device 18 is maintained.

As soon as an 868 MHz radio signal is received via the UHF antenna 6, it is supplied to the rectifier circuit via the switching device 18 and the passive filter stage 7. Following filtering in the passive filter 13, the demodulated radio signal is applied to the input of the detection device. If the radio signal has been subjected to amplitude modulation with a 125 kHz modulation signal, the detection device 16 recognizes a valid wakeup signal and decodes the address. If the address matches the address associated with the appliance 1, the detection device 16 sends a wakeup signal to the microcomputer 2, whereupon the latter is switched to the operating state. The microcomputer 2 then connects the UHF antenna 6 to the UHF transceiver 3 via the switching device 18. Furthermore, the microcomputer 2 transmits a confirmation report about the waking to the UHF transceiver 3.

The UHF transceiver 3 is then used to effect data communication between the base station 5 or the further appliance and a sensor 20 which is connected to the UHF transceiver 3 via a wired communication line. The data communication may involve the use of various modulation types, packet handling and/or CRC checks.

When the data interchange has taken place, the microcomputer 2 connects the UHF antenna 6 to the passive filter stage, again via the switching device 18. Furthermore, the microcomputer 2 and the UHF transceiver 3 are switched to the quiescent state.

The electronic appliance 1 can also wake an appropriate different appliance by virtue of the UHF transceiver 3 providing an 868 MHz carrier onto which a modulation signal is modulated by amplitude modulation, said modulation signal having previously been subjected to OOK modulation with a data signal which matches the address signal from the other appliance. In this case, the UHF antenna 6 is connected to the UHF transceiver 3 via the switching device 18.

It should also be mentioned that a high-impedance, narrowband UHF amplifier may be arranged between the UHF antenna and the filter stage 7 and/or the UHF transceiver.

What is claimed is:

1. An electronic appliance (1) having an electrical circuit and an operating mode switching device (18) which is associated with the latter and which can be used to wake the electrical circuit from a quiescent state into an operating state in which the current draw of the electrical circuit is greater than in the quiescent state, having a receiver for receiving a radio signal which has a UHF carrier which has been subjected to amplitude modulation with a modulation signal, wherein the receiver has a UHF antenna (6) which is connected to an input of a passive rectifier circuit (8) via a passive filter stage (7), wherein an output of the passive rectifier circuit (8) is connected to a detection device (16) for the modulation signal, and wherein the operating mode switching device (18) has a control connection to the detection device (16) for the purpose of waking the electrical circuit which is in the quiescent state, the improvement which comprises:

means for matching the output impedance of the rectifier circuit (8) to the input impedance of the detection device (16), wherein the means for matching the output impedance of the rectifier circuit (8) to the input impedance of the detection device (16) includes a passive filter (9) operatively arranged between the output of the passive rectifier circuit (8) and the input of the detection device (16) for passing the modulation signal, and the passive filter stage (7) and/or the passive filter (9) has/have an LC resonant circuit including a quartz oscillator (12) and/or a microacoustic resonator.

2. The electronic appliance (1) as claimed in claim 1, wherein the passive filter (9) passes a modulation signal, the frequency range of which is between 10 kHz and 1.3 MHz.

3. The electronic appliance (1) of claim 2, wherein the passive filter (9) passes a modulation signal, the frequency of which is particularly above 30 kHz.

4. The electronic appliance (1) of claim 3, wherein the passive filter (9) passes a modulation signal, the frequency of which is preferably above 100 kHz.

5. The electronic appliance (1) as claimed in claim 1, wherein the LC resonant circuit has a capacitance (13) which is connected in series with the quartz oscillator (12) and/or the microacoustic resonator in a current path which connects the UHF antenna (6) to a connection for a constant potential, and in that the quartz oscillator (12) and/or the microacoustic resonator and the capacitance (13) are connected to a node (17) which is connected to the input of the rectifier circuit (8).

6. The electronic appliance (1) as claimed in claim 1, wherein the LC resonant circuit has a capacitance (13) which is connected in series with the quartz oscillator (12) and/or the microacoustic resonator in a current path which connects the output of the passive rectifier circuit (8) to a connection for a constant potential, and in that the quartz oscillator (12) and/or the microacoustic resonator and the capacitance (13) are connected to a node (15) to which the detection device (16) is connected.

7. The electronic appliance (1) as claimed in claim 1, wherein the LC resonant circuit is a series resonant circuit which is arranged in a current path which connects the UHF antenna (6) to the passive rectifier circuit (8).

8. The electronic appliance (1) as claimed in claim 7, wherein the operating mode switching apparatus (18) is operatively arranged in the current path which connects the UHF antenna (6) to the passive rectifier circuit (8) for periodically interrupting this current path.

9. The electronic appliance (1) as claimed in claim 1, wherein the modulation signal has a carrier signal which is modulated with an information signal, the detection device (16) has a demodulation device for demodulating the information signal, the detection device (16) has a correlation device for comparing the information signal with a predetermined address signal that is associated with the electronic appliance (1), and the correlation device has a control connection to the operating mode switching device (18) such that the electrical circuit is woken only when the data signal matches the address signal.

10. The electronic appliance (1) as claimed in claim 9, wherein the electrical circuit further includes a UHF transceiver (3) that is connected to the UHF antenna (6) in the form of a radio node.

11. The electronic appliance (1) as claimed in claim 10, wherein the electrical circuit further includes a microcomputer (2).

12. The electronic appliance (1) as claimed in claim 11, wherein the operating mode switching device (18) is for selectively or alternately connecting the UHF antenna (6) to the UHF transceiver (3) or the passive filter stage (7), the operating mode switching device (18) has the control connection to the detection device (16) such that the UHF antenna (6) is connected to the passive filter stage (7) in the quiescent state of the electrical circuit and to the UHF transceiver (3) in the operating state.

* * * * *